(12) United States Patent
Takeuchi

(10) Patent No.: US 9,636,592 B2
(45) Date of Patent: May 2, 2017

(54) SERVER, RECORDING MEDIUM AND SYSTEM

(71) Applicant: GREE, Inc., Minato-ku, Tokyo (JP)

(72) Inventor: Masaru Takeuchi, Minato-ku (JP)

(73) Assignee: GREE, INC., Tokyo (JP)

(*) Notice: Subject to any disclaimer, the term of this patent is extended or adjusted under 35 U.S.C. 154(b) by 363 days.

(21) Appl. No.: 14/185,361

(22) Filed: Feb. 20, 2014

(65) Prior Publication Data

US 2014/0243096 A1    Aug. 28, 2014

(30) Foreign Application Priority Data

Feb. 28, 2013 (JP) .................................. 2013-039892

(51) Int. Cl.
    *A63F 13/30*    (2014.01)
    *A63F 13/822*    (2014.01)
    *A63F 13/73*    (2014.01)

(52) U.S. Cl.
    CPC ............ *A63F 13/822* (2014.09); *A63F 13/73* (2014.09)

(58) Field of Classification Search
    CPC ........ A63F 13/822; A63F 13/69; A63F 13/73; A63F 13/12
    USPC .......................................................... 463/42
    See application file for complete search history.

(56) References Cited

U.S. PATENT DOCUMENTS

| 6,666,770 B1* | 12/2003 | Kubo | ........................ A63F 1/18 |
| | | | 273/308 |
| 2001/0039206 A1* | 11/2001 | Peppel | ...................... A63F 9/24 |
| | | | 463/31 |
| 2003/0109299 A1* | 6/2003 | Reizei | ..................... A63F 13/10 |
| | | | 463/11 |
| 2005/0021159 A1 | 1/2005 | Ogawa | |

(Continued)

FOREIGN PATENT DOCUMENTS

| JP | 2005-34303 | 2/2005 |
| JP | 2008-142352 | 6/2008 |

OTHER PUBLICATIONS

Kinetic, https://www.youtube.com/watch?v=SXnUYdDoylo, published Jan. 28, 2013.*

(Continued)

*Primary Examiner* — Michael Cuff
(74) *Attorney, Agent, or Firm* — Oblon, McClelland, Maier & Neustadt, L.L.P.

(57) ABSTRACT

A server includes a storage unit storing characteristic data objects of each user, each characteristic data object having a first parameter value representing an ability of the characteristic data object to exert power, a second parameter value representing an ability to reduce the first parameter value of each characteristic data object of another user different from the user having the characteristic data object, and one of attributes having a superiority-inferiority relationship relative to each other. The server further includes a receiving unit receiving a game proceeding instruction from a device of each user, and a parameter adjusting unit (Continued)

adjusting the second parameter value of each characteristic data object of the user of the device, based on a first number of characteristic data objects of the user that have an attribute superior to a first attribute assigned among characteristic data objects of a second user different from the user.

4 Claims, 6 Drawing Sheets

(56) References Cited

U.S. PATENT DOCUMENTS

| | | | |
|---|---|---|---|
| 2006/0040746 A1* | 2/2006 | Eguchi | A63F 1/02 463/43 |
| 2008/0200226 A1 | 8/2008 | Ichimura | |
| 2009/0023487 A1* | 1/2009 | Gilson | A63F 1/00 463/11 |
| 2013/0225259 A1* | 8/2013 | Kojo | A63F 13/12 463/22 |

OTHER PUBLICATIONS

Weekly Famitsu, Enterbrain Inc., vol. 26, No. 33, Published Jul. 28, 2011, pp. 88-91 (7pp).
Famitsu Xbox, Enterbrain Inc., vol. 1, No. 8, Published Dec. 1, 2002, pp. 70-73 (5pp).
Gemaga, Softbank Creative Corp., vol. 29, No. 2, Published, Feb. 1, 2012, p. 68 (4pp).
Office action mailed on Feb. 25, 2014 in corresponding Japanese Application No. 2013-039892 including English translation, 5pp.
Appli Fan, Kabushiki Kaisha Cosmic Publishing, Jul. 1, 2012, vol. 3, pp. 104-107, including Examiner's description of reference from the above-identified Office action.
Japanese Office action dated Mar. 29, 2016 issued in corresponding JP Patent Application No. 2015-009771, including English translation, 6pp.

* cited by examiner

| USER ID | NAME | IMAGE | CARD ID | DECK CARD ID | HEALTH POINT | OPPONENT USER ID |
|---|---|---|---|---|---|---|
| 1 | USER 1 | u1.jpg | 1, 2, 3 | 1, 2, 3 | 300 | 2 |
| 2 | USER 2 | u2.jpg | 4, 5, 6 | 4, 5, 6 | 300 | 1 |
| ... | ... | ... | ... | ... | ... | ... |

| CARD ID | NAME | IMAGE | ATTRIBUTE | OFFENSIVE POWER | DEFENSIVE POWER | HEALTH POINT | ADJUSTED OFFENSIVE POWER | ADJUSTED DEFENSIVE POWER |
|---|---|---|---|---|---|---|---|---|
| 1 | CARD 1 | c1.jpg | FIRE | 100 | 100 | 100 | 109 | 109 |
| 2 | CARD 2 | c2.jpg | FIRE | 200 | 50 | 100 | 218 | 55 |
| ... | ... | ... | ... | ... | ... | ... | ... | ... |

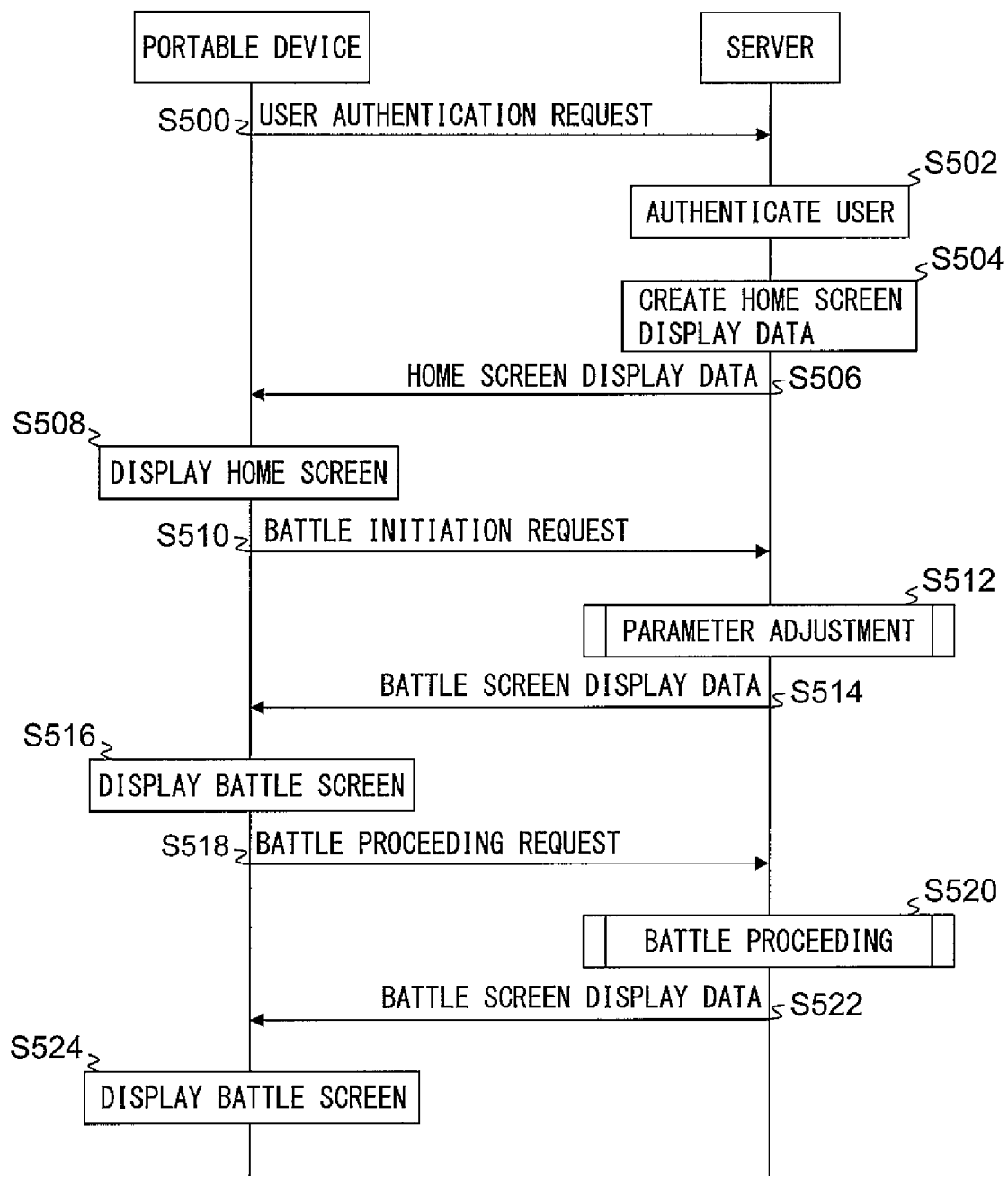

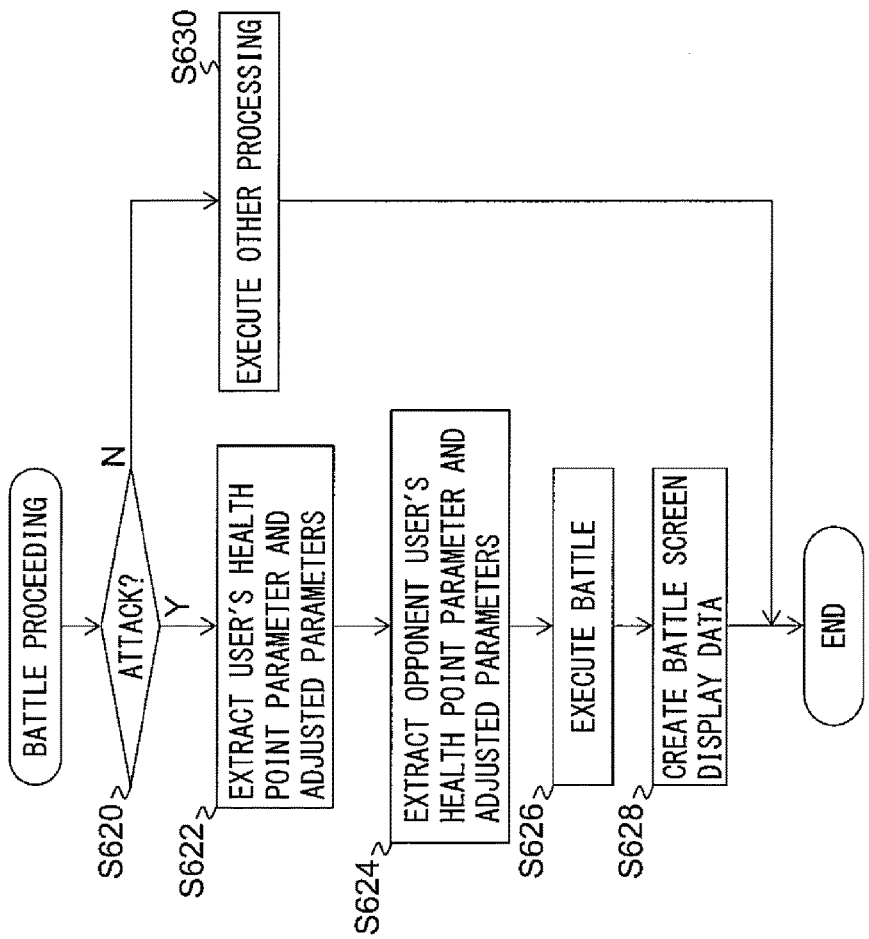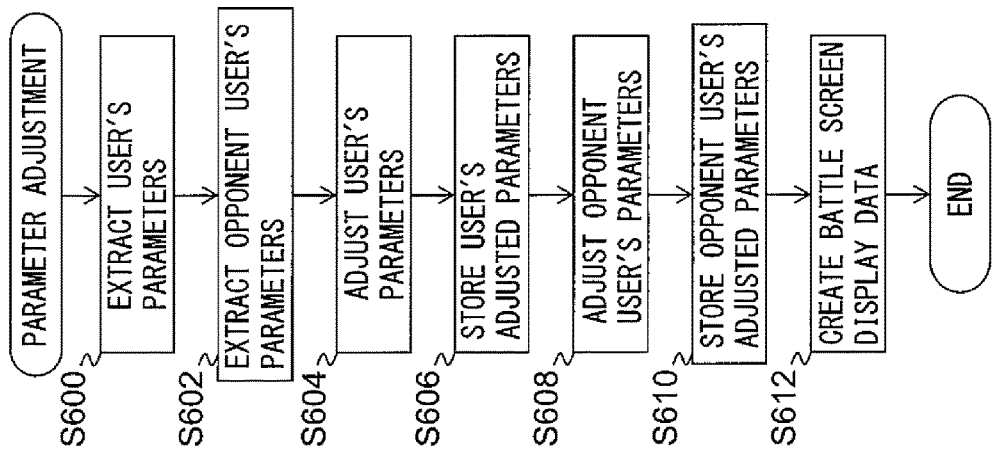

SERVER, RECORDING MEDIUM AND SYSTEM

CROSS REFERENCE TO RELATED APPLICATION

This application is a new U.S. patent application that claims benefit of JP 2013-39892, filed on Feb. 28, 2013. The entire content of JP 2013-39892 is hereby incorporated by reference.

TECHNICAL FIELD

The present invention relates to a server, a recording medium, and a system.

BACKGROUND

Servers that provide games to portable devices over communication networks have been widespread in recent years. Games provided by such servers include those in which multiple users can participate (so-called "social games"), and among such games there are known those which not only enable users to battle against or cooperate with each other but also allow them to communicate with each other (for example, refer to Japanese Unexamined Patent Publication No. 2005-034303).

As an example of such social games, a game is also known in which a user battles against another user by using, for example, cards (so-called "card battle games") (for example, refer to Japanese Unexamined Patent Publication No. 2008-142352). In a card battle game, each user can hold an arbitrary number of cards. Further, by using at least one held card, each user forms a set of cards ("deck") to be used for the battle. Each card has parameters such as offensive power, defensive power, health point, etc., and, based on the parameter values of the cards forming the deck, the user tries to reduce the health point parameter value of the other user. The other user also, based on the parameter values of the cards forming the deck, tries to reduce the health point parameter value of the user. The users thus stage an attack against each other in turn and, when the health point parameter value of one of the users is reduced to zero, the battle ends.

In such a card battle game, it is common practice to determine the total parameter value of the deck by simply adding up the parameter values of the cards forming the deck. It has also been common, for example, to change the parameter values of the cards according to the number of cards forming the deck or the combination of the cards.

SUMMARY

However, prior art card battle games do not change the parameter values of the cards according to the number of cards forming the deck or the combination of the cards. As such conditions become apparent, the deck pattern tends to be the same, which could discourage a user from continuing the game.

The present invention has been devised to overcome the above prior art problem, and an object of the invention is to provide a server, a recording medium, and a system that can maintain and enhance the motivation of the user to continue the game.

A server includes a storage unit which stores a plurality of characteristic data objects of each of users, each characteristic data object having a first parameter value representing an ability of the characteristic data object to exert power, a second parameter value representing an ability of the characteristic data object to reduce the first parameter value of each characteristic data object of another user who is different from the user having the characteristic data object, and one of a plurality of attributes having a superiority-inferiority relationship relative to each other. The server further includes a receiving unit which receives a game proceeding instruction from a device of each of the users, and a parameter adjusting unit which adjusts the second parameter value of each characteristic data object of the user of the device, based on a first number of characteristic data objects, among the plurality of characteristic data objects of the user, that have an attribute superior to a first attribute assigned among a plurality of characteristic data objects of a second user who is different from the user.

Preferably, in the above server, the parameter adjusting unit adjusts the second parameter value of each characteristic data object of the user by multiplying the second parameter value by an addition rate determined based on the first number.

Preferably, the above server further includes a game proceeding unit which creates display data while reducing the first parameter value of each characteristic data object of the second user based on the adjusted second parameter value, and a transmitting unit which transmits the display data to the device.

Preferably, in the above server, the parameter adjusting unit adjusts the second parameter value of each characteristic data object of the second user, based on a second number of characteristic data objects, among the plurality of characteristic data objects of the second user, that have an attribute superior to a second attribute assigned among the plurality of characteristic data objects of the user.

A non-transitory computer-readable recording medium having recorded thereon a control program for a server, the server comprising a storage unit which stores a plurality of characteristic data objects of each of users, each characteristic data object having a first parameter value representing an ability of the characteristic data object to exert power, a second parameter value representing an ability of the characteristic data object to reduce the first parameter value of each characteristic data object of another user who is different from the user having the characteristic data object, and one of a plurality of attributes having a superiority-inferiority relationship relative to each other. The control program causes the server to execute a process. The process includes receiving a game proceeding instruction from a device of each of the users, and adjusting the second parameter value of each characteristic data object of the user of the device, based on a first number of characteristic data objects, among the plurality of characteristic data objects of the user, that have an attribute superior to a first attribute assigned among a plurality of characteristic data objects of a second user who is different from the user.

A system includes a server which includes a storage unit which stores a plurality of characteristic data objects of each of users, each characteristic data object having a first parameter value representing an ability of the characteristic data object to exert power, a second parameter value representing an ability of the characteristic data object to reduce the first parameter value of each characteristic data object of another user who is different from the user having the characteristic data object, and one of a plurality of attributes having a superiority-inferiority relationship relative to each other. The server further includes a receiving unit which receives a game proceeding instruction from a device of each of the users, and a parameter adjusting unit which adjusts the second parameter value of each characteristic data object of the user of the device, based on a first number of characteristic data objects, among the plurality of characteristic data objects of the user, that have an attribute superior to a first attribute assigned among a plurality of characteristic data objects of a second user who is different from the user. The system further includes a device which transmits the proceeding instruction to the server.

By adjusting the parameter values of each user's characteristic data objects based on the attributes of each user's characteristic data objects, the above server, recording medium and system can increase the attractiveness of the game, and thus maintain and enhance the motivation of the user to continue the game, which serves to maintain the user's interest in the game.

BRIEF DESCRIPTION OF THE DRAWINGS

Other features and advantages of the present optical device will be apparent from the ensuing description, taken in conjunction with the accompanying drawings, in which:

FIG. 5 is a diagram showing an example of the sequence of operations performed in the game system; and FIGS. 6a and 6b show an example of an operation flow of the server.

DESCRIPTION

Hereinafter, with reference to the drawings, a server, a recording medium, and a system will be described. It should be noted that the technical scope of the present invention is not limited to embodiments of the invention but covers the invention described in the claims and its equivalent.

In the present embodiment, a user battles against another user by using cards. Each user holds an arbitrary number of cards (characteristic data objects), and forms a deck by using at least one card selected from among the cards held. Each card has a "fire" attribute, a "wood" attribute, or a "water" attribute, in addition to parameters such as offensive power, defensive power, health point (a parameter representing an ability to exert power), etc. In accordance with an instruction from the user, the user's portable device transmits a request to a server to request a battle with another user. In response to the request, the server initiates the battle with the opponent. Prior to the initiation of the battle with the opponent, the server adjusts the parameter values of the cards forming each user's deck, based on the attributes of the cards. The server causes the battle to proceed based on the adjusted parameter values.

Figure 1A:
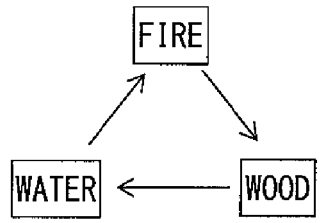
FIGS. 1a to 1c show an example of a method for adjusting the parameter values.

A superiority-inferiority relationship is predefined between the attributes. FIG. 1a shows an example of the superiority-inferiority relationship between the attributes. In FIG. 1a, it is shown that the "fire" attribute is superior to the "wood" attribute, the "wood" attribute is superior to the "water" attribute, and the "water" attribute superior to the "fire" attribute. That is, it is shown that there is a scissors-paper-rock relationship between these attributes.

Based on the superiority-inferiority relationship predefined between the attributes, the server adjusts the parameter values of the cards. For example, for each given attribute, the server calculates the following equations to adjust the parameter value of each card that has the given attribute.

$$r=1+(n_s \times n_i)/100 \qquad \text{(equation 1)}$$

$$p'=r \times p \qquad \text{(equation 2)}$$

where $n_s$ is the number (first number) of cards having the given attribute among the cards forming the user's deck, $n_i$ is the number of cards having the attribute inferior to the given attribute among the cards forming the opponent user's deck, r is the addition rate for the given attribute, p is the parameter value of the card having the given attribute, and p' is the adjusted parameter value of the card having the given attribute. More specifically, the addition rate for the given attribute is calculated by using the equation 1, and the parameter value of the card having the given attribute is adjusted by multiplying the parameter value by the addition rate determined for the given attribute.

Figure 1B:
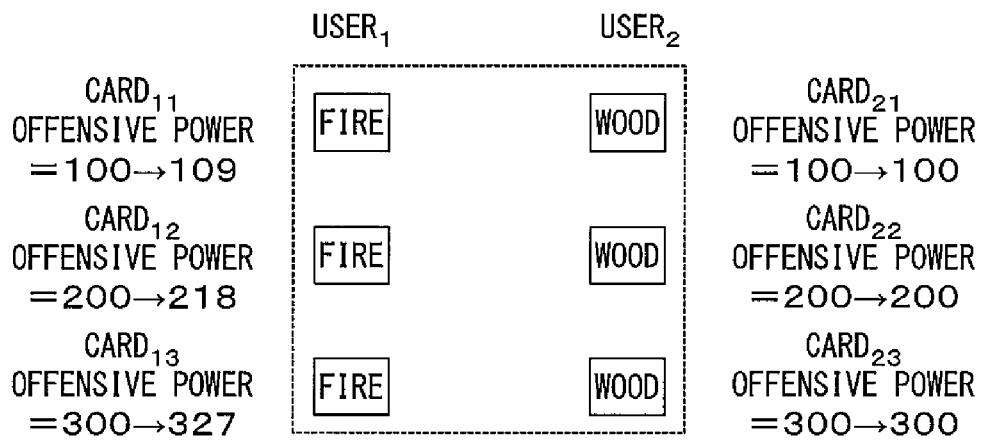

FIG. 1b shows an example of how the parameter values are adjusted. In FIG. 1b, it is shown that the $user_1$'s deck is formed by three cards having the "fire" attribute and that the $user_2$'s deck is formed by three cards having the "wood" attribute. In this case, when the $user_2$ is seen from the $user_1$, the number of cards having the "fire" attribute among the cards forming the $user_1$'s deck is three, and the number of cards having the "wood" attribute inferior to the "fire" attribute among the cards forming the $user_2$'s deck is also three. Therefore, the addition rate r for the "fire" attribute is calculated as $$r=1+(3\times 3)/100=1.09$$

Accordingly, the parameter value (for example, offensive power parameter value) p' of the $card_{11}$ is calculated as $$p'=1.09\times 100=109$$

and is thus adjusted from "100" to "109". Similarly, the parameter value of the $card_{12}$ is adjusted from "200" to "218", and the parameter value of the $card_{13}$ is adjusted from "300" to "327".

On the other hand, when the $user_1$ is seen from the $user_2$, the number of cards having the "wood" attribute among the cards forming the $user_2$'s deck is three, but the number of cards having the "water" attribute inferior to the "wood" attribute among the cards forming the $user_1$'s deck is zero. Therefore, the addition rate r for the "wood" attribute is calculated as $$r=1+(3\times 0)/100=1$$

Accordingly, the parameter values of the $card_{21}$ to the $card_{23}$ are adjusted to the same values as their original values.

Figure 1C:
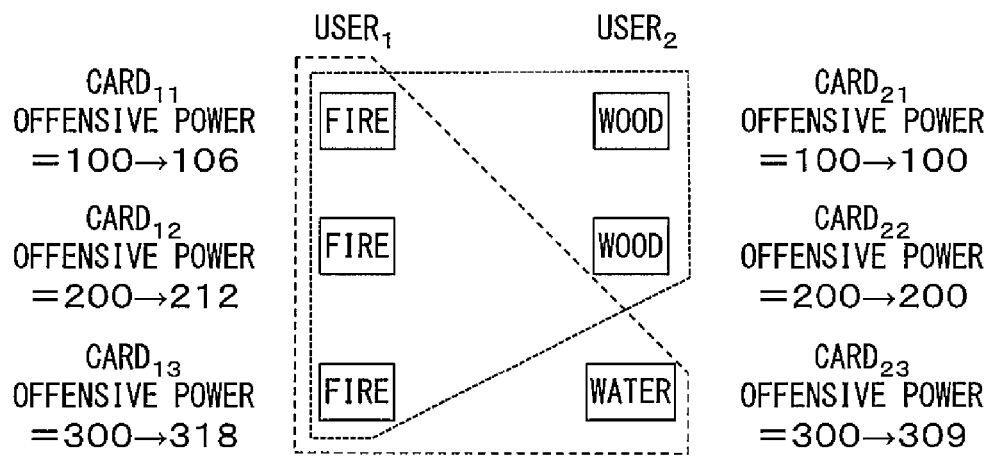

FIG. 1c shows another example of how the parameter values are adjusted. In FIG. 1c, it is shown that the $user_1$'s deck is formed by three cards having the "fire" attribute and that the $user_2$'s deck is formed by two cards having the "wood" attribute and one card having the "water" attribute. In this case, when the $user_2$ is seen from the $user_1$, the number of cards having the "fire" attribute among the cards forming the $user_1$'s deck is three, and the number of cards having the "wood" attribute inferior to the "fire" attribute among the cards forming the $user_2$'s deck is two. Therefore, the addition rate r for the "fire" attribute is calculated as $$r=1+(3\times 2)/100=1.06$$

Accordingly, the parameter value p' of the $card_{11}$ is calculated as $$p'=1.06\times100=106$$

and is thus adjusted from "100" to "106". Similarly, the parameter value of the $card_{12}$ is adjusted from "200" to "212", and the parameter value of the $card_{13}$ is adjusted from "300" to "318".

On the other hand, when the $user_1$ is seen from the $user_2$, the number of cards having the "wood" attribute among the cards forming the $user_2$'s deck is two, but the number of cards having the "water" attribute inferior to the "wood" attribute among the cards forming the $user_1$'s deck is zero. Therefore, the addition rate r for the "wood" attribute is calculated as $$r=1+(2\times0)/100=1$$

Accordingly, the parameter values of the $card_{21}$ and the $card_{22}$ are adjusted to the same values as their original values.

Further, the number of cards having the "water" attribute among the cards forming the $user_2$'s deck is one, and the number of cards having the "fire" attribute inferior to the "water" attribute among the cards forming the $user_1$'s deck is three. Therefore, the addition rate r for the "water" attribute is calculated as $$r=1+(1\times3)/100=1.03$$

Accordingly, the parameter value p' of the $card_{23}$ is calculated as $$p'=1.03\times300=309$$

and is thus adjusted from "300" to "309".

Figure 2:
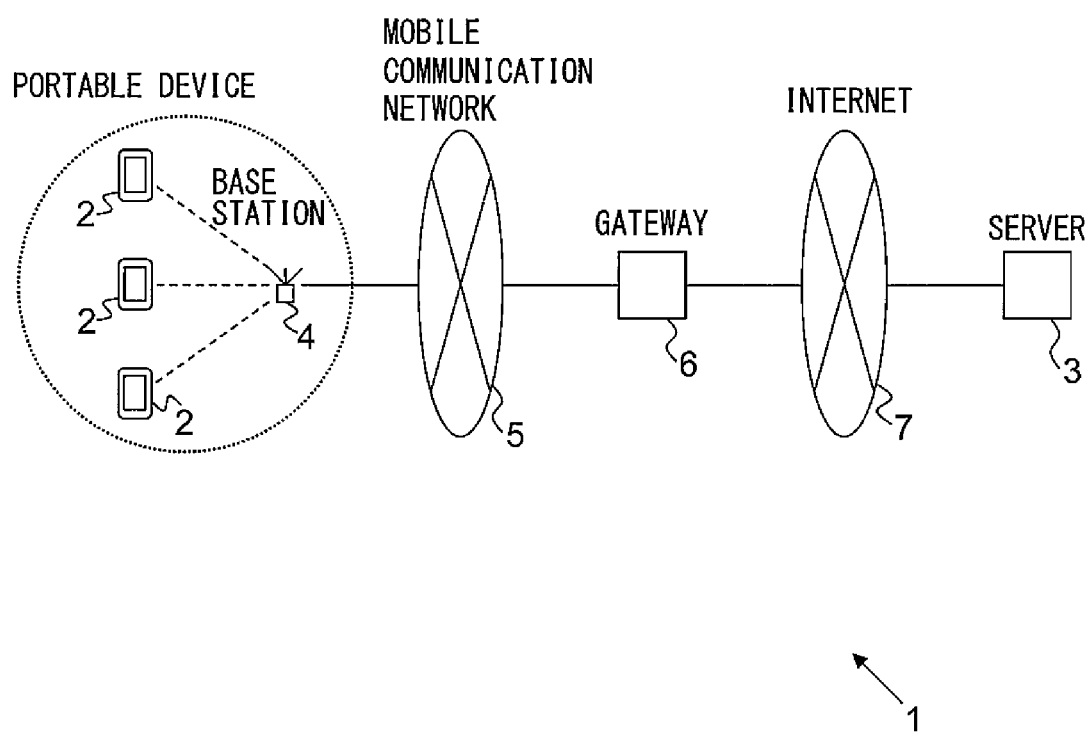
FIG. 2 shows an example of a schematic configuration of a game system.

FIG. 2 shows an example of a schematic configuration of a game system 1.

The game system 1 includes at least one portable device 2 and a server 3. The portable device 2 and the server 3 are interconnected via a communication network, for example, via a base station 4, a mobile communication network 5, a gateway 6, and the Internet 7. A program (for example, a browsing program) executed on the portable device 2 and a program (for example, a game program) executed on the server 3 communicate with each other by using a communication protocol such as Hypertext Transfer Protocol (HTTP).

Figure 3:
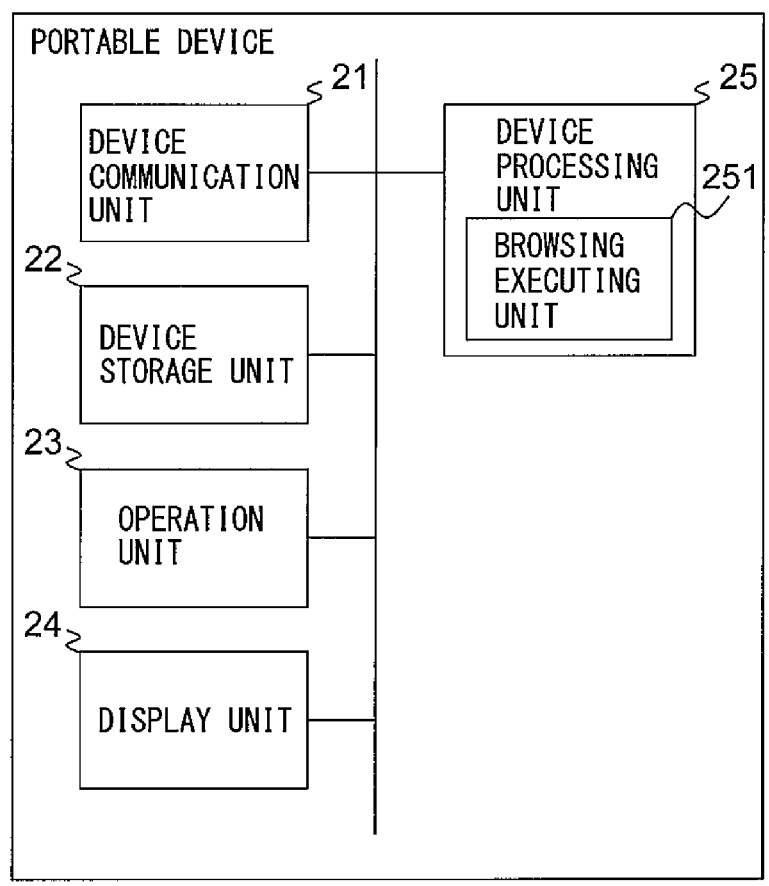
FIG. 3 shows an example of a schematic configuration of the portable device.

FIG. 3 shows an example of a schematic configuration of the portable device 2.

The portable device 2 is connected to the server 3 via the base station 4, the mobile communication network 5, the gateway 6, and the Internet 7, to communicate with the server 3. In accordance with an operation of an operation unit 23 (a button, etc.) by the user, the portable device 2 requests the proceeding of a card battle game of the server 3. The portable device 2 receives display data concerning the proceeding of the card battle game from the server 3, and displays the data. For this purpose, the portable device 2 includes a device communication unit 21, a device storage unit 22, the operation unit 23, a display unit 24, and a device processing unit 25.

In the present embodiment, the portable device 2 is assumed to be a multi-function mobile telephone ("smartphone"), but the present invention is not limited to this particular type of device. The portable device 2 may be, for example, an ordinary mobile phone ("feature phone"), a personal digital assistant (PDA), a portable game machine, a portable music player, a tablet PC, or the like, as long as the present invention can be applied thereto.

The device communication unit 21 includes a communication interface circuit which includes an antenna having sensitivity to a designated frequency band, and connects the portable device 2 to the wireless communication network. The device communication unit 21 establishes a wireless signal circuit with the base station 4 in accordance with a communication scheme such as CDMA (Code Division Multiple Access) by using a channel allocated by the base station 4, and communicates with the base station 4. Then, the device communication unit 21 transmits data supplied from the device processing unit 25 to the server 3, etc. Further, the device communication unit 21 supplies data received from the server 3, etc., to the device processing unit 25.

The device storage unit 22 includes at least one device selected, for example, from among a semiconductor memory, a magnetic disk device, and an optical disk device. The device storage unit 22 stores an operating system program, driver programs, application programs, data, etc., to be used for processing in the device processing unit 25. For example, the device storage unit 22 stores driver programs such as an input device driver program for controlling the operation unit 23 and an output device driver program for controlling the display unit 24. Further, the device storage unit 22 stores application programs such as a program for retrieving and displaying display data concerning the proceeding of the card battle game. Furthermore, the device storage unit 22 stores data such as display data, video data, image data, etc., concerning the proceeding of the card battle game. The device storage unit 22 may further store temporary data associated with prescribed processing.

The operation unit 23 may be, for example, a touch pad, a keyboard, or any other suitable device that can operate the portable device 2. The user can input letters, numerals, etc., by using the operating unit 23. When operated by the user, the operation unit 23 generates a signal corresponding to the operation. The generated signal is supplied as a user instruction to the device processing unit 25.

The display unit 24 may be, for example, a liquid crystal display, an organic EL (Electro-Luminescence) display, or any other suitable device that can display video, images, etc. The display unit 24 displays video, images, etc., corresponding to the video data and the image data supplied from the device processing unit 25.

The device processing unit 25 includes one or a plurality of processors and their peripheral circuits. The device processing unit 25 centrally controls the entire operation of the portable device 2, and is, for example, a CPU (Central Processing Unit). The device processing unit 25 controls the operation of the device communication unit 21, the display unit 24, etc., so that various kinds of processing of the portable device 2 are performed in appropriate procedures in accordance with the programs stored in the device storage unit 22 and with the operation of the operation unit 23, etc. The device processing unit 25 executes processing based on the programs (the operating system program, driver programs, application programs, etc.) stored in the device storage unit 22. The device processing unit 25 can execute a plurality of programs (application programs, etc.) in parallel.

The device processing unit 25 includes at least a browsing executing unit 251. This unit is a functional module implemented by a program executed on the processor included in the device processing unit 25. Alternatively, this unit may be implemented as firmware in the portable device 2.

The browsing executing unit 251 retrieves and displays display data concerning the proceeding of the card battle game. That is, in response to an instruction from the user, the browsing executing unit 251 transmits a request to the server 3 via the device communication unit 21 to retrieve the display data concerning the proceeding of the card battle game. The browsing executing unit 251 receives the corresponding display data from the server 3 via the device communication unit 21. The browsing executing unit 251 creates drawing data based on the received display data. More specifically, the browsing executing unit 251 analyzes the received display data to identify control data and content data, and creates the drawing data by laying out the identified content data in accordance with the identified control data. Then, the browsing executing unit 251 outputs the created drawing data to the display unit 24.

Figures 4A, 4B, 4C:
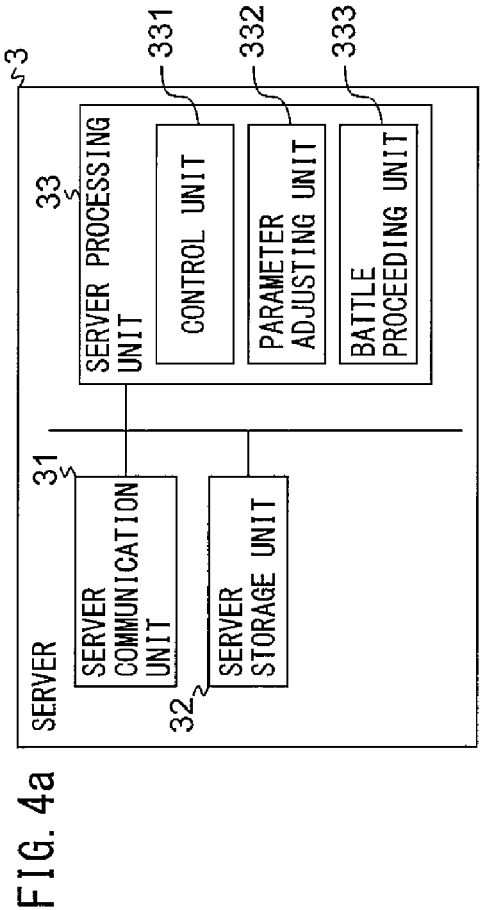
FIGS. 4a to 4c show an example of a schematic configuration of the server.

FIG. 4*a* shows an example of a schematic configuration of the server 3.

In response to the request from the portable device 2, the server 3 causes the card battle game to proceed. At the same time, the server 3 creates the display data concerning the proceeding of the card battle game and transmits the display data to the portable device 2. For this purpose, the server 3 includes a server communication unit 31, a server storage unit 32, and a server processing unit 33.

The server communication unit 31 includes a communication interface circuit for connecting the server 3 to the Internet 7, and communicates with the Internet 7. Then, the server communication unit 31 supplies the data received from the portable device 2, etc., to the server processing unit 33. Further, the server communication unit 31 transmits the data supplied from the server processing unit 33 to the portable device 2, etc.

The server storage unit 32 includes at least one device selected, for example, from among a magnetic tape device, a magnetic disk device, and an optical disk device. The serer storage unit 32 stores an operating system program, driver programs, application programs, data, etc., to be used for processing in the server processing unit 33. For example, the server storage unit 32 stores application programs such as a card battle game program for causing the card battle game to proceed and for creating display data concerning the results. Furthermore, the server storage unit 32 stores data in the form of tables such as a user management table (FIG. 4*b*) for managing the users and a card management table (FIG. 4*c*) for managing the cards. The server storage unit 32 may further store temporary data associated with prescribed processing.

FIG. 4*b* shows an example of the data structure of the user management table for managing the users. The user management table contains entries for each user that include the user ID, name, image data file name, user card IDs, deck card IDs, health point parameter, and opponent user ID, etc. The deck card IDs refer to the IDs of the cards selected as a deck from among the cards that the user holds. The health point parameter is the parameter that represents the remaining amount of the user's health point.

FIG. 4*c* shows an example of the data structure of the card management table for managing the cards. The card management table contains entries for each card that include the card ID, card name, image data file name, attribute, parameters such as offensive power, defensive power, and health point, and adjusted parameters, etc. The adjusted parameters refer to the parameters that have been adjusted by a parameter adjusting unit 332 to be described later.

The server processing unit 33 includes one or a plurality of processors and their peripheral circuits. The server processing unit 33 centrally controls the entire operation of the server 3, and is, for example, a CPU. The server processing unit 33 controls the operation of the server communication unit 31, etc., so that various kinds of processing of the server 3 are performed in appropriate procedures in accordance with the programs stored in the server storage unit 32, etc. The server processing unit 33 executes processing based on the programs (the operating system program, driver programs, application programs, etc.) stored in the server storage unit 32. The server processing unit 33 can execute a plurality of programs (application programs, etc.) in parallel.

The server processing unit 33 includes a control unit 331, the parameter adjusting unit 332, and a battle proceeding unit 333. These units are functional modules implemented by a program executed on the processor included in the server processing unit 33. Alternatively, these units may be implemented as firmware in the server 3.

The process performed by the control unit 331 will be described below.

The control unit 331 controls the proceeding of the card battle game, and instructs the parameter adjusting unit 332, the battle proceeding unit 333, etc., to perform necessary processing.

When a user authentication request is received from the portable device 2 via the server communication unit 31, the control unit 331 analyzes the received user authentication request and identifies the user ID and password. Then, by using the identified user ID and password as parameters, the control unit 331 instructs a user authenticating unit (not shown) to perform the necessary processing.

When the user has been authenticated by the user authenticating unit not shown, the control unit 331 creates home screen display data. More specifically, the control unit 331 refers to the user management table stored in the server storage unit 32, and designates the opponent user based on a predetermined criterion (with equal probability by using, for example, a pseudo-random number generated using current time or the like as a seed). Further, the control unit 331 extracts the designated opponent user's ID, name, and image data file name. Then, the control unit 331 creates the home screen display data, including the extracted opponent user ID and the identified user ID, for arranging the extracted name, the image indicated by the file name, a button for accepting a battle initiation instruction, etc., in accordance with a prescribed layout.

The control unit 331 transmits the created home screen display data to the portable device 2 via the server communication unit 31.

When a battle initiation request is received from the portable device 2 via the server communication unit 31, the control unit 331 instructs the parameter adjusting unit 332 to perform processing by using the received battle initiation request as a parameter.

Further, when a battle proceeding request is received from the portable device 2 via the server communication unit 31, the control unit 331 instructs the battle proceeding unit 333 to perform processing by using the received battle proceeding request as a parameter.

The control unit 331 transmits the created battle screen display data to the portable device 2 via the server communication unit 31.

The process performed by the parameter adjusting unit 332 will be described below.

The parameter adjusting unit 332 extracts the attributes and parameters of the cards forming each user's deck. More specifically, the parameter adjusting unit 332 analyzes the received battle initiation request and identifies the user ID and the opponent user ID. Further, by using the identified user ID as the key, the parameter adjusting unit 332 refers to the user management table stored in the server storage unit 32, and identifies the corresponding user. Then, the parameter adjusting unit 332 extracts the deck card IDs of the identified user. Further, by using the extracted card IDs as the keys, the parameter adjusting unit 332 refers to the card management table stored in the server storage unit 32, and identifies the corresponding cards. Then, the parameter adjusting unit 332 extracts the attributes and the parameters, such as offensive power, defensive power, and health point, associated with each identified card.

Similarly, by using the identified opponent user ID as the key, the parameter adjusting unit 332 refers to the user management table stored in the server storage unit 32, and identifies the corresponding user. Then, the parameter adjusting unit 332 extracts the deck card IDs of the identified user. Further, by using the extracted card IDs as the keys, the parameter adjusting unit 332 refers to the card management table stored in the server storage unit 32, and identifies the corresponding cards. Then, the parameter adjusting unit 332 extracts the attributes and the parameters, such as offensive power, defensive power, and health point, associated with each identified card.

The parameter adjusting unit 332 adjusts the extracted parameter values. More specifically, based on the extracted attribute associated with each user, the parameter adjusting unit 332 adjusts the extracted parameter values such as offensive power, defensive power, etc., associated with the user. Then, the parameter adjusting unit 332 stores these adjusted values as the adjusted parameter values for the identified user's cards in the card management table stored in the server storage unit 32.

Similarly, based on the extracted attribute associated with each user, the parameter adjusting unit 332 adjusts the extracted parameter values such as offensive power, defensive power, etc., associated with the opponent user. Then, the parameter adjusting unit 332 stores these adjusted values as the adjusted parameter values for the identified opponent user's cards in the card management table stored in the server storage unit 32.

The method of adjusting the parameter values is the same as that described earlier.

The parameter adjusting unit 332 sets the health point parameter for each user. More specifically, the parameter adjusting unit 332 sums the extracted health point parameter values associated with the user. Then, the parameter adjusting unit 332 stores the sum as the health point parameter value of the identified user in the user management table stored in the server storage unit 32.

Likewise, the parameter adjusting unit 332 sums the extracted health point parameter values associated with the opponent user. Then, the parameter adjusting unit 332 stores the sum as the health point parameter value of the identified opponent user in the user management table stored in the server storage unit 32.

The parameter adjusting unit 332 sets the opponent user for each user. More specifically, the parameter adjusting unit 332 stores the identified opponent user ID as the ID of the opponent user for the identified user in the user management table stored in the server storage unit 32.

Similarly, the parameter adjusting unit 332 stores the identified user ID as the ID of the opponent user for the identified opponent user in the user management table stored in the server storage unit 32.

The parameter adjusting unit 332 creates battle screen display data. More specifically, by using the identified user ID as the key, the parameter adjusting unit 332 refers to the user management table stored in the server storage unit 32, and extracts the image data file name, deck card IDs, and health point parameter associated with the corresponding user. Further, by using the extracted card IDs as the keys, the parameter adjusting unit 332 refers to the card management table stored in the server storage unit 32, and extracts the image data file name associated with each corresponding card.

Similarly, by using the identified opponent user ID as the key, the parameter adjusting unit 332 refers to the user management table stored in the server storage unit 32, and extracts the image data file name, deck card IDs, and health point parameter associated with the corresponding user. Further, by using the extracted card IDs as the keys, the parameter adjusting unit 332 refers to the card management table stored in the server storage unit 32, and extracts the image data file name associated with each corresponding card.

Then, the parameter adjusting unit 332 creates the battle screen display data, including the identified user ID, for arranging the image indicated by the extracted file name and the health point parameter associated with each extracted user, a button for accepting an attack execution instruction, etc., in accordance with a prescribed layout.

Then, the parameter adjusting unit 332 terminates the process.

The process performed by the battle proceeding unit 333 will be described below.

The battle proceeding unit 333 causes the battle to proceed. More specifically, the battle proceeding unit 333 analyzes the received battle proceeding request and identifies the type of instruction and the user ID. If the identified type of instruction is "attack execution", the battle proceeding unit 333 executes an attack process.

The battle proceeding unit 333 extracts each user's health point parameter and the adjusted parameters of the cards forming the user's deck. More specifically, by using the identified user ID as the key, the battle proceeding unit 333 refers to the user management table stored in the server storage unit 32, and identifies the corresponding user. Then, the battle proceeding unit 333 extracts the deck card IDs, the health point parameter, and the ID of the opponent user for the identified user. Further, by using the extracted card IDs as the keys, the battle proceeding unit 333 refers to the card management table stored in the server storage unit 32, and extracts the adjusted parameters of each corresponding card.

Similarly, by using the extracted opponent user ID as the key, the battle proceeding unit 333 refers to the user management table stored in the server storage unit 32, and identifies the corresponding user. Then, the battle proceeding unit 333 extracts the deck card IDs and the health point parameter for the identified user. Further, by using the extracted card IDs as the keys, the battle proceeding unit 333 refers to the card management table stored in the server storage unit 32, and extracts the adjusted parameters of each corresponding card.

The battle proceeding unit 333 executes the battle by performing various processing concerning the battle. For example, the battle proceeding unit 333 updates the health point parameter value of the opponent user, based on the sum of the adjusted offensive power parameter values associated with the user and the sum of the adjusted defensive power parameter values associated with the opponent user. Then, the battle proceeding unit 333 stores the updated value as the health point parameter value of the identified opponent user in the user management table stored in the server storage unit 32.

Similarly, the battle proceeding unit 333 updates the health point parameter value of the user, based on the sum of the adjusted offensive power parameter values associated with the opponent user and the sum of the adjusted defensive power parameter values associated with the user. Then, the battle proceeding unit 333 stores the updated value as the health point parameter value of the identified user in the user management table stored in the server storage unit 32.

The battle proceeding unit 333 creates battle screen display data. More specifically, by using the identified user ID as the key, the battle proceeding unit 333 refers to the user management table stored in the server storage unit 32, and extracts the image data file name, deck card IDs, and health point parameter associated with the corresponding user. Further, by using the extracted card IDs as the keys, the battle proceeding unit 333 refers to the card management table stored in the server storage unit 32, and extracts the image data file name associated with each corresponding card.

Similarly, by using the identified opponent user ID as the key, the battle proceeding unit 333 refers to the user management table stored in the server storage unit 32, and extracts the image data file name, deck card IDs, and health point parameter associated with the corresponding user. Further, by using the extracted card IDs as the keys, the battle proceeding unit 333 refers to the card management table stored in the server storage unit 32, and extracts the image data file name associated with each corresponding card.

Then, the battle proceeding unit 333 creates the battle screen display data, including the identified user ID, for arranging the image indicated by the extracted file name and the health point parameter associated with each extracted user, a button for accepting an attack execution instruction, etc., in accordance with a prescribed layout.

On the other hand, if the identified type of instruction is other than "attack execution", the battle proceeding unit 333 executes the processing that matches the type of instruction.

Then, the battle proceeding unit 333 terminates the process.

FIG. 5 is a diagram showing an example of the sequence of operations performed in the game system 1. The sequence of operations described hereinafter is executed primarily by the device processing unit 25 and the server processing unit 33 in cooperation with each of the units of the portable device 2 and the server 3, based on the programs prestored in the device storage unit 22 and the server storage unit 32, respectively.

The user operates the operation unit 23 to instruct the device processing unit 25 to execute a program for retrieving and displaying the display data concerning the proceeding of the card battle game. The device processing unit 25 starts the processing based on the program. More specifically, when the user ID and password are inputted by the user operating the operation unit 23, the browsing executing unit 251, which is implemented by the program, transmits a user authentication request including the inputted user ID and password to the server 3 via the device communication unit 21 (step S500).

When the user authentication request is received from the portable device 2 via the server communication unit 31, the control unit 331 analyzes the received user authentication request and identifies the user ID and password. Then, by using the identified user ID and password as parameters, the control unit 331 instructs the user authenticating unit (not shown) to perform the necessary processing (step S502).

When the user has been authenticated by the user authenticating unit not shown, the control unit 331 creates home screen display data (step S504).

The control unit 331 transmits the created home screen display data to the portable device 2 via the server communication unit 31 (step S506).

When the home screen display data is received from the server 3 via the device communication unit 21, the browsing executing unit 251 creates drawing data based on the received home screen display data. The browsing executing unit 251 outputs the created drawing data to the display unit 24 to display the home screen (step S508).

When an instruction for initiating a battle with another user is inputted on the home screen by the user operating the operation unit 23, the browsing executing unit 251 transmits a battle initiation request including the user ID included in the received home screen display data, the opponent user ID corresponding to that other user, etc., to the server 3 via the device communication unit 21 (step S510).

When the battle initiation request is received from the portable device 2 via the server communication unit 31, the control unit 331 instructs the parameter adjusting unit 332 to perform processing by using the received battle initiation request as a parameter (step S512).

FIG. 6a shows an example of an operation flow of the parameter adjusting unit 332.

The parameter adjusting unit 332 analyzes the received battle initiation request and identifies the user ID and the opponent user ID. Further, the parameter adjusting unit 332 extracts the attributes and parameters of the cards forming the user's deck (step S600).

The parameter adjusting unit 332 also extracts the attributes and parameters of the cards forming the opponent user's deck (step S602).

The parameter adjusting unit 332 adjusts the extracted parameter values associated with the user (step S604).

The parameter adjusting unit 332 stores these adjusted values as the adjusted parameter values for the user's cards (step S606).

Further, the parameter adjusting unit 332 adjusts the extracted parameter values associated with the opponent user (step S608).

The parameter adjusting unit 332 stores these adjusted values as the adjusted parameter values for the opponent user's cards (step S610).

The parameter adjusting unit 332 creates battle screen display data (step S612). Then, the parameter adjusting unit 332 terminates the process.

Turning back to FIG. 5, the control unit 331 transmits the created battle screen display data to the portable device 2 via the server communication unit 31 (step S514).

When the battle screen display data is received from the server 3 via the device communication unit 21, the browsing executing unit 251 creates drawing data based on the received battle screen display data. The browsing executing unit 251 outputs the created drawing data to the display unit 24 to display the battle screen (step S516).

When an attack execution instruction or the like is inputted on the battle screen by the user operating the operation unit 23, the browsing executing unit 251 transmits a battle proceeding request including the type of instruction, the user ID included in the received battle screen display data, etc., to the server 3 via the device communication unit 21 (step S518).

When the battle proceeding request is received from the portable device 2 via the server communication unit 31, the control unit 331 instructs the battle proceeding unit 333 to perform processing by using the received battle proceeding request as a parameter (step S520).

FIG. 6b is a diagram showing an example of an operation flow of the battle proceeding unit 333.

The battle proceeding unit 333 analyzes the received battle proceeding request and identifies the type of instruction and the user ID. If the identified type of instruction is "attack execution" (Yes in step S620), the battle proceeding unit 333 extracts the user's health point parameter, the adjusted parameters of the cards forming the user's deck, and the opponent user ID (step S622).

Similarly, the battle proceeding unit 333 extracts the opponent user's health point parameter and the adjusted parameters of the cards forming the opponent user's deck (step S624).

The battle proceeding unit 333 executes the battle by performing various processing concerning the battle (step S626).

The battle proceeding unit 333 creates battle screen display data (step S628). Then, the battle proceeding unit 333 terminates the process.

On the other hand, if the identified type of instruction is other than "attack execution", the battle proceeding unit 333 executes the processing that matches the type of instruction (step S630). Then, the battle proceeding unit 333 terminates the process.

Turning back to FIG. 5, the control unit 331 transmits the created battle screen display data to the portable device 2 via the server communication unit 31 (step S522).

When the battle screen display data is received from the server 3 via the device communication unit 21, the browsing executing unit 251 creates drawing data based on the received battle screen display data. The browsing executing unit 251 outputs the created drawing data to the display unit 24 to display the battle screen (step S524).

As has been described above, by adjusting the parameter values of each user's cards based on the attributes of each user's cards, the attractiveness of the game can be increased, and thus the motivation of the user to continue the game can be maintained and enhanced, which serves to maintain the user's interest in the game.

The invention is not limited to the present embodiment. For example, in the present embodiment, three different card attributes have been defined and used, but the number of card attributes may be two or four or more, as long as a superiority-inferiority relationship is predefined between the attributes. This increases the attractiveness of the game, and further motivates the user to continue the game.

While the present embodiment has been described by taking as an example a game in which one user battles against another user, the user may be made to battles against a character created by a game program. In this case, since the user can battle against various opponents, the attractiveness of the game increases, and further motivates the user to continue the game.

A computer program for causing a computer to execute the respective functions of the device processing unit 25 and the server processing unit 33 may be provided in a form recorded on a computer readable recording medium such as a magnetic recording medium or an optical recording medium.

It should be understood that various changes, substitutions, and modifications can be made to the present invention by those skilled in the art without departing from the spirit and scope of the present invention.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A server device for providing a battle game to terminal devices of a plurality of users, the server device comprising:
   a storage unit which stores a card table including data for a plurality of cards, each of the plurality of cards having an identifier, a health point, an offensive power, a defensive power, an adjusted offensive power, an adjusted defensive power, and one of a plurality of attributes, each of the plurality of attributes having a circular superiority-inferiority relationship relative to each other, wherein the storage unit further stores, for each of the plurality of users, an identifier of one or more cards used by said each user for playing a battle event in the game, in association with information stored for said each user;
   a receiving unit which receives an instruction for proceeding with the battle event from a terminal device of a first user, the receiving unit further receives the identifier of the one or more cards from a terminal device of each of the plurality of users;
   a user identifying unit which identifies a second user as an opponent of the first user for playing the battle event in the game;
   a parameter adjusting unit which determines the number of cards used by the first user and the second user in the battle event, adjusts the offensive power and the defensive power of each of the cards used by the first user to larger values when a first number and a second number increase, and determines the adjusted offensive power and the adjusted defensive power of said each card, the first number being the number of cards used by the first user in the battle event that have the same attribute as said each card, the second number being the number of cards which are used by the second user in the battle event that have an attribute inferior to said same attribute;
   a transmitting unit which transmits, to the terminal device of the first user, display data for displaying a battle screen on the terminal device, the battle screen including an image of a card whose offensive power and defensive power have been adjusted by the parameter adjusting unit, and a button for accepting an attack execution instruction from the first user; and
   a battle proceeding unit which reduces the health point of the first user and the second user in accordance with the adjusted offensive power and the adjusted defensive power of the cards used by the first and second users, continuously monitors a progress of the battle event, and proceeds with the battle event until the health point of one of the first and second users is reduced to a predetermined value.

2. The server according to claim 1, wherein the parameter adjusting unit adjusts the offensive power and defensive power of each card of the first user by multiplying the offensive power and defensive powers by an addition rate determined based on the first number and the second number.

3. A non-transitory computer-readable recording medium having recorded thereon a control program for a server to provide a battle game to terminal devices of a plurality of users, the server device, the server comprising a storage unit, the control program causing the server to execute a process, the process comprising:
    storing a card table including data for a plurality of cards, each of the plurality of cards having an identifier, a health point, an offensive power, a defensive power, an adjusted offensive power, an adjusted defensive power, and one of a plurality of attributes, each of the plurality of attributes having a circular superiority-inferiority relationship relative to each other, wherein the storage unit further stores, for each of the plurality of users, an identifier of one or more cards used by said each user for playing a battle event in the game, in association with information stored for said each user;
    receiving an instruction for proceeding with the battle event from a terminal device of a first user, the receiving unit further receives the identifier of the one or more cards from a terminal device of each of the plurality of users;
    identifying a second user as an opponent of the first user for playing the battle event in the game;
    determining the number of cards used by the first user and the second user in the battle event, adjusting the offensive power and the defensive power of each of the cards used by the first user to larger values when a first number and a second number increase, and determining the adjusted offensive power and the adjusted defensive power of said each card, the first number being the number of cards used by the first user in the battle event that have the same attribute as said each card, the second number being the number of cards which are used by the second user in the battle event that have an attribute inferior to said same attribute;
    transmitting, to the terminal device of the first user, display data for displaying a battle screen on the terminal device, the battle screen including an image of a card whose offensive power and defensive power have been adjusted by the parameter adjusting unit, and a button for accepting an attack execution instruction from the first user; and
    a battle proceeding unit which reduces the health point of the first user and the second user in accordance with the adjusted offensive power and the adjusted defensive power of the cards used by the first and second users, continuously monitors a progress of the battle event, and proceeds with the battle event until the health point of one of the first and second users is reduced to a predetermined value.

4. A system for providing a battle game to terminal devices of a plurality of users, the server device comprising:
    a server which includes
        a storage unit which stores a card table including data for a plurality of cards, each of the plurality of cards having an identifier, a health point, an offensive power, a defensive power, an adjusted offensive power, an adjusted defensive power, and one of a plurality of attributes, each of the plurality of attributes having a circular superiority-inferiority relationship relative to each other, wherein the storage unit further stores, for each of the plurality of users, an identifier of one or more cards used by said each user for playing a battle event in the game, in association with information stored for said each user;
        a receiving unit which receives an instruction for proceeding with the battle event from a terminal device of a first user, the receiving unit further receives the identifier of the one or more cards from a terminal device of each of the plurality of users;
        a user identifying unit which identifies a second user as an opponent of the first user for playing the battle event in the game;
        a parameter adjusting unit which determines the number of cards used by the first user and the second user in the battle event, adjusts the offensive power and the defensive power of each of the cards used by the first user to larger values when a first number and a second number increase, and determines the adjusted offensive power and the adjusted defensive power of said each card, the first number being the number of cards used by the first user in the battle event that have the same attribute as said each card, the second number being the number of cards which are used by the second user in the battle event that have an attribute inferior to said same attribute;
        a transmitting unit which transmits, to the terminal device of the first user, display data for displaying a battle screen on the terminal device, the battle screen including an image of a card whose offensive power and defensive power have been adjusted by the parameter adjusting unit, and a button for accepting an attack execution instruction from the first user; and
        a battle proceeding unit which reduces the health point of the first user and the second user in accordance with the adjusted offensive power and the adjusted defensive power of the cards used by the first and second users, continuously monitors a progress of the battle event, and proceeds with the battle event until the health point of one of the first and second users is reduced to a predetermined value; and
    a device which transmits the proceeding instruction to the server.

* * * * *